United States Patent
Kalyanasundaram et al.

(10) Patent No.: US 9,380,595 B2
(45) Date of Patent: Jun. 28, 2016

(54) METHODS AND APPARATUS FOR COMMUNICATION SCHEDULING

(71) Applicant: Nokia Siemens Networks Oy, Espoo (FI)

(72) Inventors: Suresh Kalyanasundaram, Bangalore (IN); Balamurali Natarajan, Bangalore (IN); Joseph Lester, Chandler, AZ (US)

(73) Assignee: Nokia Solutions and Networks Oy, Espoo (FI)

( * ) Notice: Subject to any disclaimer, the term of this patent is extended or adjusted under 35 U.S.C. 154(b) by 138 days.

(21) Appl. No.: 13/871,175

(22) Filed: Apr. 26, 2013

(65) Prior Publication Data

US 2014/0321342 A1 Oct. 30, 2014

(51) Int. Cl.
*H04W 72/12* (2009.01)
*H04W 76/04* (2009.01)

(52) U.S. Cl.
CPC ........ *H04W 72/1205* (2013.01); *H04W 76/048* (2013.01)

(58) Field of Classification Search
CPC . H04W 72/00; H04W 72/12; H04W 72/1205; H04W 72/121; H04W 72/1221; H04W 72/1226; H04W 72/1231; H04W 72/1252; H04W 72/1257; H04W 76/00; H04W 76/04; H04W 76/048
See application file for complete search history.

(56) References Cited

U.S. PATENT DOCUMENTS

| | | | |
|---|---|---|---|
| 2009/0303927 A1* | 12/2009 | Kolding et al. | 370/328 |
| 2010/0202392 A1 | 8/2010 | Zhang | 370/329 |
| 2010/0232366 A1* | 9/2010 | Iwamura et al. | 370/329 |
| 2010/0322090 A1* | 12/2010 | Zhang et al. | 370/252 |
| 2013/0051337 A1* | 2/2013 | Kiyoshima et al. | 370/329 |

FOREIGN PATENT DOCUMENTS

EP 2 398 285 A1 12/2011
WO WO-2009/098353 A1 8/2009

OTHER PUBLICATIONS

"Discussion about dual connectivity", Renesas Mobile Europe, 3GPP TSG-RAN WG2 Meeting #81, R2-130657, Jan. 28-Feb. 1, 2013, 6 pgs.
"Discussion of DRX Scheduling in Carrier Aggregation", 3GPP TSG-RAN WG2 #68, R2-097037, Nov. 9-13, 2009. 7 pgs.

* cited by examiner

*Primary Examiner* — Feben M Haile
(74) *Attorney, Agent, or Firm* — Harrington & Smith (57) ABSTRACT

Systems and techniques for discontinuous reception management for user devices communicating using carrier aggregation. Information relating to discontinuous reception for a user device is received and used to determine discontinuous reception states of the user device. The information relating to discontinuous reception may include, for example, past scheduling information, information received at one scheduler and reporting scheduling information for another scheduler, or discontinuous reception information managed at a media access control layer of a base station. The discontinuous reception information may be used for scheduling of a plurality of carriers used for carrier aggregation by a user device, with scheduling for each carrier being performed by a scheduler dedicated to that carrier.

27 Claims, 6 Drawing Sheets

METHODS AND APPARATUS FOR COMMUNICATION SCHEDULING

TECHNICAL FIELD

The present invention relates generally to wireless communication. More particularly, the invention relates to improved systems and techniques for management of downlink carrier aggregation.

BACKGROUND

As the number of wireless cellular data communication devices continues to increase and as their data capabilities continue to be more and more heavily used, the demands on available infrastructure and frequencies continue to increase. The addition of infrastructure to meet demand is costly, and is becoming more and more difficult as unoccupied space suitable for placement of larger base stations diminishes. In addition, as saturation of available wireless communication frequencies approaches, addition of conventional infrastructure approaches a point of ineffectiveness.

In order to support the growing demand for data communication services, therefore, network operators are turning more and more to managing existing resources, particularly frequency resources, so as to increase the number of users served by the resources. One approach is to provide for the use of multiple carriers serving a single user device. For example, a larger base station might use a first carrier to serve its connected user devices, and various smaller base stations might be connected to one or another of the same user devices, with each of the smaller base stations using its own carrier to serve its connected devices, with these devices also being served by a carrier of the larger base station.

SUMMARY

In one embodiment of the invention, an apparatus comprises at least one processor and memory storing computer program code. The memory storing the computer program code is configured to, with the at least one processor, cause the apparatus to at least receive information relating to discontinuous reception states of a user device operating in a wireless communication network, wherein the user device engages in communication in the network on at least two carriers and wherein discontinuous reception states of the user device depend at least in part on scheduling decisions made with respect to each carrier, and determine discontinuous reception states of the user device for use of at least one scheduler managing downlink communication by the user device, wherein the determination is based at least in part on the information relating to the discontinuous reception states of the user device.

In another embodiment of the invention, a method comprises receiving information relating to discontinuous reception states of a user device operating in a wireless communication network, wherein the user device engages in communication in the network on at least two carriers and wherein discontinuous reception states of the user device depend at least in part on scheduling decisions made with respect to each carrier, and determining discontinuous reception states of the user device for use of at least one scheduler managing downlink communication by the user device, wherein the determination is based at least in part on the information relating to the discontinuous reception states of the user device.

In another embodiment of the invention, a computer readable medium stores a program of instructions. Execution of the program of instructions by a processor configures an apparatus to at least receive information relating to discontinuous reception states of a user device operating in a wireless communication network, wherein the user device engages in communication in the network on at least two carriers and wherein discontinuous reception states of the user device depend at least in part on scheduling decisions made with respect to each carrier, and determine discontinuous reception states of the user device for use of at least one scheduler managing downlink communication by the user device, wherein the determination is based at least in part on the information relating to the discontinuous reception states of the user device.

DETAILED DESCRIPTION

Embodiments of the present invention recognize that downlink carrier aggregation is typically performed using two or more carriers, with scheduling being managed by a different processor core for each carrier. The reason for this is that a single core generally does not have sufficient processing capability to manage scheduling for more than one carrier.

Embodiments of the invention recognize that discontinuous reception (DRX) states are handled in a processor core managing scheduling, and that DRX on-duration and off-duration are based on activity on both carriers. If a user device, referred to a user equipment (UE) in networks operating according to the third generation partnership project (3GPP) and 3GPP long term evolution (LTE) and LTE-advanced (LTE-A), is in an "active" duration, it is "active" and listening to a physical downlink control channel (PDCCH) on both carriers. In typical existing configurations, one set of parameters are allocated to the UE by radio resource control.

Currently, DRX states are handled in a scheduler core. The activity needs to be tracked on both carriers to determine of the UE is active and listening to PDCCH or not, and existing approaches face difficulties presented by the insufficiency of computing resources to manage more than one carrier in a single core. One or more embodiments of the current invention split scheduler processing across different cores while managing DRX states in ways that provide both simplicity of implementation and scalability.

Figure 1:
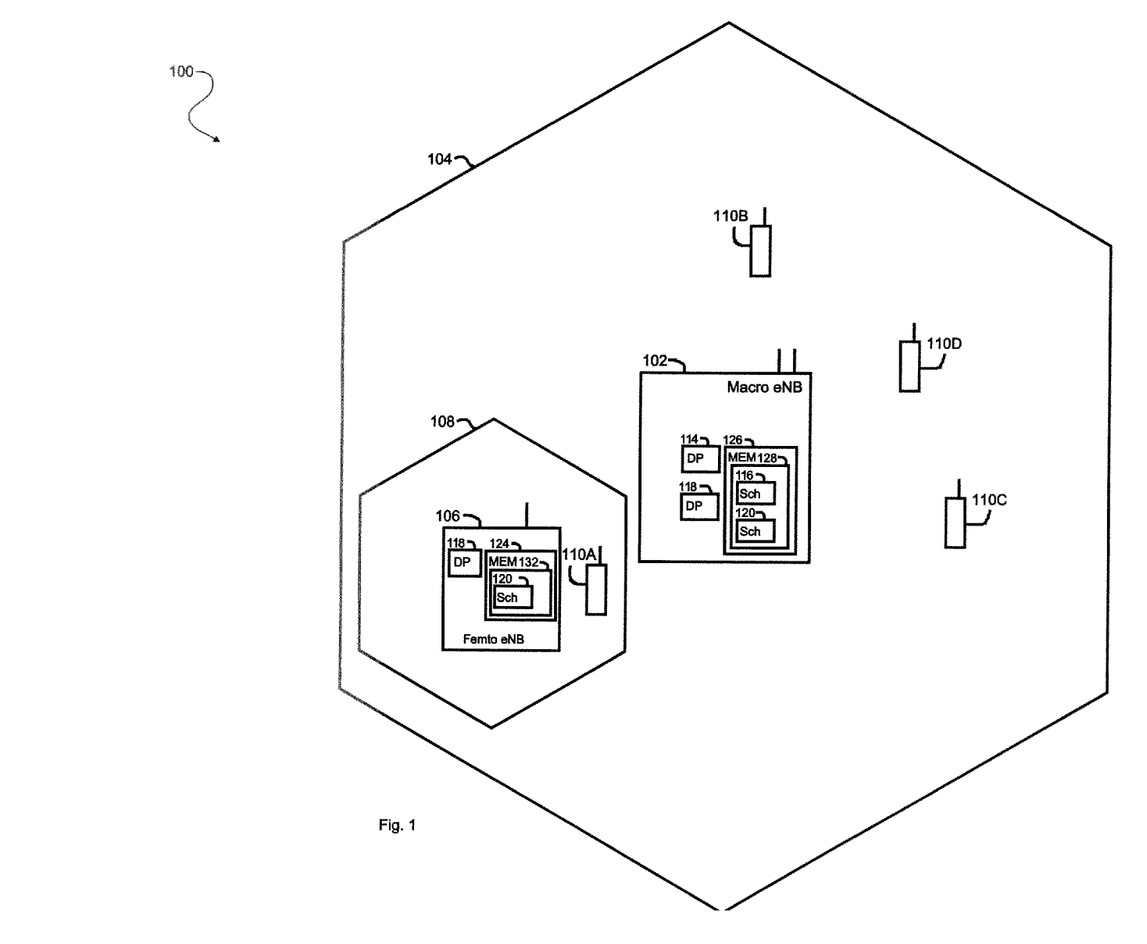
FIG. 1 illustrates a wireless communications network according to an embodiment of the present invention.

FIG. 1 illustrates a network 100 according to an embodiment of the present invention, comprising a macro base station, suitably implemented as a macro eNodeB (eNB) 102. The coverage provided by the eNB 102 defines a primary cell 104. The network 100 also comprises a smaller, lower range base station which may be referred to as a femto eNB 106, which defines a secondary cell 108. The network 100 supports a number of user devices implemented as UEs 110A-110C, which may communicate using multiple carriers—in the present exemplary embodiment, to communicate with the macro eNB 102 using a first carrier and the femto eNB 106 using a second carrier. It will also be recognized that communicating using multiple carriers is not limited to the use of carriers provided by different base stations. A single base station may provide for communication using multiple carriers and may implement transmitter, receiver, and antenna elements adapted to communicate with a UE using separate carriers. For example, one carrier may be used for data communications and one carrier may be used for control communications. Thus, in the exemplary network 100 of FIG. 1, the macro eNB 102 may use the first carrier and a third carrier to communicate with an UE 110D, which is configured to communicate with the macro eNB 102 using a dual carrier connection.

Each UE is scheduled independently for each carrier. One processor core is devoted to scheduling of UEs for each carrier, and scheduling of a UE for a carrier includes management of the DRX state, in order to determine, for each subframe of each carrier, whether the UE will be listening to the PDCCH in that subframe.

Embodiments of the invention provide for a number of approaches. Consider, as an example, the macro eNB 102 and the femto eNB 106. The macro eNB 102 may employ a first processing core 114, running a scheduler 116, and a second processor core 118, running a scheduler 120, and the femto eNB 106 may employ a third processor core 122, running a scheduler 124. The schedulers 116 and 120 may reside in memory 126, as part of programs 128, and the scheduler 124 may reside in memory 130, as part of programs 132.

A number of different embodiments of the invention may be employed, with differing degrees of sharing of information between schedulers and varying degrees of robustness against possible confusion resulting from lack of information on the part of one scheduler as to the activities of another scheduler.

1. In a first embodiment, each scheduler tracks the active duration of the DRX state independently for itself, and determines whether the UE will be listening to the PDCCH in a particular subframe. In some instances, it may happen that one of the schedulers show the UE as inactive, but the UE may nevertheless be active due to activity on the other carrier. Embodiments of the invention recognize, however, that such situations may be expected to be relatively infrequent. Particularly in the case of a high load scenario, a UE is generally scheduled on a carrier for long periods of time. Thus, little detriment to operation results from estimation by the other carrier that the UE is in DRX inactive state, because the UE will seldom be scheduled on the other carrier. In addition, the cases in which a UE is unscheduled on one carrier but active on another typically occur when the UE has not had data to transmit for a long period, and in such cases carrier aggregation is generally not needed.

This approach of this first embodiment is simple to implement, and requires no changes to existing scheduler implementations. Difficulties that may arise include decreased throughput and increased latency under some circumstances. It may be that one of the schedulers sees the UE as being in a DRX inactive state when the UE is in fact in a DRX active state. For example, a UE may be scheduled on a secondary cell, while the primary cell sees the UE as not being scheduled, based on the knowledge that the UE is not being scheduled on the primary cell. During scheduling, a snapshot of the UE's current state is sent to one or both schedulers, and a determination as to whether to send the snapshot to one scheduler or to both schedulers is made based on buffer size. If the buffer size becomes smaller than the threshold at which the snapshot is not split, the snapshot is sent to the primary cell and not the secondary cell, but the primary cell will not schedule the UE because it sees the UE as in a DRX inactive state. In addition, this approach requires DRX state management to be replicated in both schedulers, making for duplication of processing effort.

2. In a second embodiment, simultaneous tracking of the DRX state is performed at the two schedulers based on information exchange. The schedulers pass scheduling information to the primary media access control (MAC), and the MAC also needs to send snapshot information to the schedulers so that the schedulers know how much data is buffered for the UE.

In this option, once the primary MAC knows whether a new transmission or a retransmission has been scheduled, it can then echo this information to the other scheduler in the next transmission time interval (TTI). In addition, information on ack/nack reception for transmissions on one carrier may be made available to the scheduler of the other carrier. Such an approach will allow each scheduler to independently track the DRX state of the UE. The DRX states may be slightly outdated, because the information on the other scheduler's actions may arrive slightly delayed.

Embodiments of the present invention provide for, in carrier aggregation arrangements, making the primary cell scheduler aware of downlink assignments (DLA) in the secondary scheduler, in order to enable the Pcell scheduler may to send a combined PUCCH decode request to the PHY layer. For monitoring of DRX, therefore, an interface between the MAC and the scheduler may be updated to include information indicating whether the transmission is an initial transmission or a retransmission. With such information, the Pcell eNB has good info to update DRX without excessive added processing load.

However, in this approach, the Scell scheduler is unaware of Pcell DLAs. In one exemplary embodiment of the invention, Pcell DLA information may be sent in the snapshot, with a snapshot format expanded from prior-art approaches to allow for transmission of the information. This format change, however, provides for a snapshot that occupies expanded space even if no CA is desired. In another exemplary embodiment, the information may be sent in a different message, and this message may be sent only in cases in which the DRX information has changed since the last update.

This second approach still allows for DRX management to be maintained in the scheduler, and maintains good awareness of DRX states. Impacts such as failing to schedule the UE when it is in a DRX active state can be expected to happen rarely, if at all. DRX state management must be replicated in both schedulers, associated duplication of processing effort. The approach involves the use of an enhanced interface between the media access control and scheduler of each of the eNBs involved in carrier aggregation (such as FIG. 1's macro eNB 102 and femto eNB 106 to the UEs 110A-110C, or the macro eNB 102 to the UE 110D). Implementing such an enhanced interface causes an increase in complexity.

In a third embodiment, tracking of the DRX state is carried out not at the scheduler, but at the primary media access control (MAC)—that is, the MAC of the eNB serving the primary cell—in the example of FIG. 1, the eNB 102. Because the primary MAC is where the data resides, and the primary MAC is aware of scheduling decisions at both the primary and the secondary carriers, the primary MAC has the information needed to track the DRX state of the UE.

This third embodiment of the invention, therefore, provides mechanisms for the primary MAC to pass DRX state information to the schedulers. For example, DRX state information can be included in snapshot information, sent every transmission time interval (TTI) from the MAC to each scheduler. In an alternative approach, the DRX state may be sent as a separate message. In this approach, rather than sending a message at every transmission time interval, or according to another fixed schedule, the message may be sent from the MAC to the scheduler only when the DRX state of the UE changes.

This third embodiment of the invention provides a good ability to track DRX states, and avoids inefficiencies caused by errors such as failing to schedule the UE when it is in a DRX active state. This embodiment also avoids duplication of DRX state management, because the state management is performed only at the primary MAC, so that the processing burden is reduced by the avoiding of duplication. As noted above, one or more embodiments of the invention provide for interface elements between the primary MAC and the schedulers to allow for communication to the schedulers of management information and operations maintained in and carried out by the primary MAC.

Figure 2:
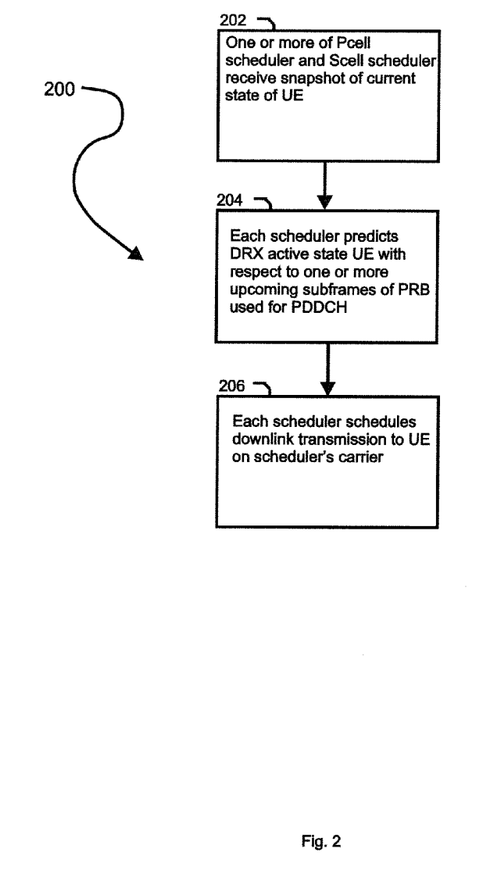
FIGS. 2-4 illustrate processes according to embodiments of the present invention.

FIG. 2 illustrates a process 200 according to an embodiment of the present invention. The process 200 may be used with an exemplary arrangement of two schedulers managing downlink communication by a UE in a carrier aggregation arrangement. The schedulers may conveniently be referred to as a Pcell scheduler performing scheduling for a Pcell carrier used by a Pcell eNB and an Scell scheduler performing scheduling for an Scell carrier used by an Scell eNB receives a snapshot of a current state of a UE. It will be noted that designations of one cell or another as a Pcell or an Scell are with respect to a given UE. Thus, a given carrier or scheduler may be a Pcell for a given UE, but may be the Scell for a different UE.

At step 202, with respect to a particular UE, one or more of a scheduler identified as the Pcell scheduler for the UE, and a scheduler identified as an Scell scheduler for the UE, receives a data snapshot of a current state of the UE. The snapshot is suitably received from a media access control layer of the primary eNB, and the decision as to whether to send the snapshot to one or both schedulers may be made based on buffer size. At block 204, each scheduler predicts the DRX active state for the UE with respect to one or more upcoming subframes of a physical resource block used for a physical downlink control channel, so as to identify when the UE is listening to the physical downlink control channel for the carrier managed by the scheduler. At block 206, each scheduler schedules downlink transmission to the UE on the scheduler's carrier.

Figure 3:
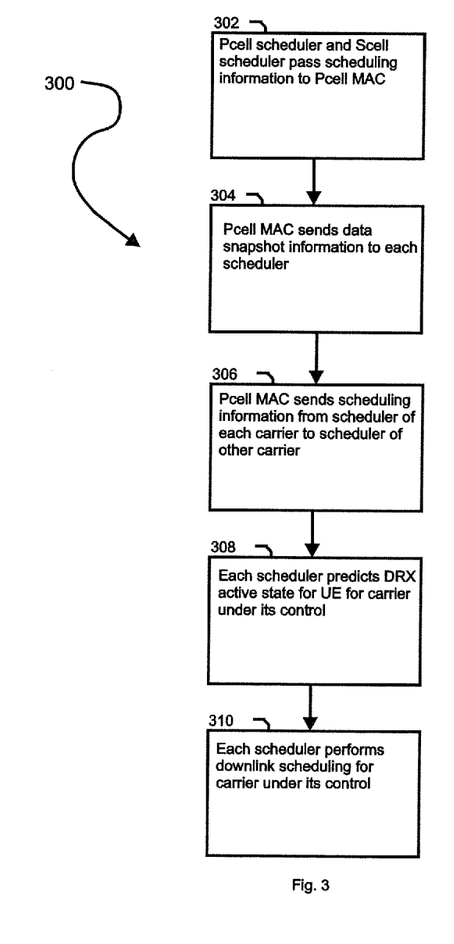

FIG. 3 illustrates a process 300 according to another embodiment of the current invention. The process 300 may be implemented for communication arrangement similar to that described above with respect to FIG. 2—namely, a Pcell scheduler and an Scell scheduler used for a Pcell and an Scell carrier used by a Pcell and an Scell eNB. At block 302, each of the Pcell scheduler and the Scell scheduler passes scheduling information to the Pcell media access control layer. At step 304, the Pcell media access control layer send data snapshot information to each scheduler. At step 306, the Pcell MAC passes scheduling information for each scheduler to the other scheduler. That is, once the primary MAC knows for the Pcell carrier whether a new transmission or a retransmission has been scheduled, it echoes this information to the Scell scheduler, and once it knows for the Scell carrier whether a new transmission or a retransmission has been scheduled, it echoes this information to the Pcell scheduler. The reciprocal scheduling information may be sent, for example, in the next transmission time interval and may be sent as part of the data snapshot. In addition, information on ack/nack reception for transmissions on the Pcell carrier may be made available to the scheduler of the Scell carrier, and vice versa.

At step 308, each scheduler predicts the DRX active state for the UE for the carrier under its control, and at step 310, each scheduler schedules downlink communication for the UE for the carrier under its control.

Figure 4:
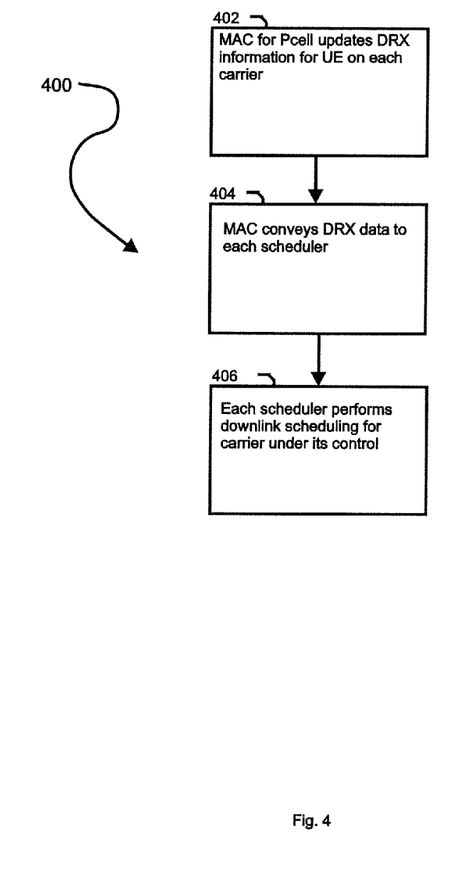

FIG. 4 illustrates a process 400 according to another embodiment of the current invention. The process 400 may be implemented for communication arrangement similar to that described above with respect to FIGS. 2 and 3—namely, a Pcell scheduler and an Scell scheduler used for a Pcell and an Scell carrier used by a Pcell and an Scell eNB. In the present embodiment, the MAC for the Pcell manages DRX information for the UE.

At step 402, the media access control layer for the primary cell updates DRX information for the UE on each carrier. At step 404, the MAC conveys DRX data to each scheduler. For example, the MAC may configure a data snapshot for each scheduler to include carrier information and DRX state information, so that DRX information is delivered with the snapshot information—for example, at every transmission time interval. In another alternative, the MAC may send DRX state information to each scheduler as a specific message, and in one or more embodiments of the invention, a message may be sent from the MAC to the scheduler only when the DRX state of the UE changes. At step 406, each scheduler performs scheduling for the UE for the carrier under its control.

Figure 5A:
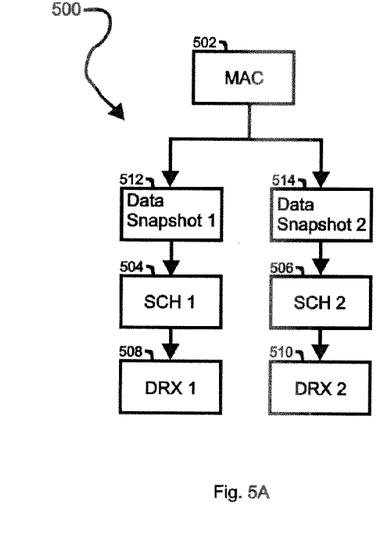
FIGS. 5A-5C illustrate information flow diagrams according to embodiments of the present invention.
Figure 5B:
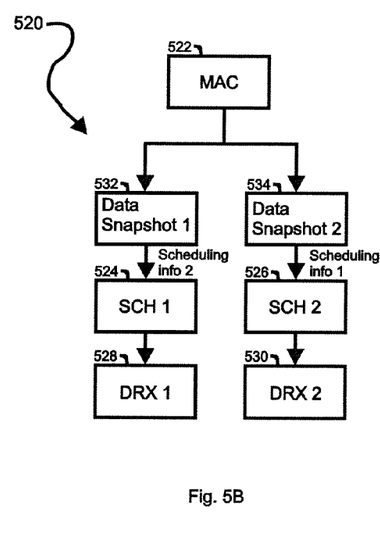
Figure 5C:
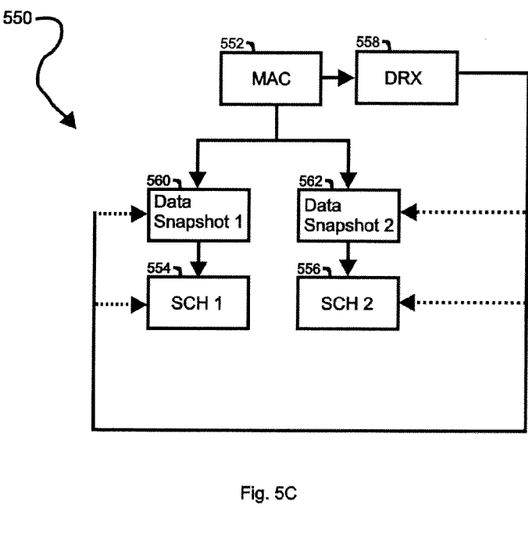

FIGS. 5A-5C illustrate data flow diagrams 500, 520, and 550, according to embodiments of the present invention, representing data flows of embodiments such as the embodiments exemplified by the processes 200, 300, and 400, of FIGS. 2, 3, and 4, respectively. The diagram 500 illustrates a MAC 502, first and second schedulers 504 and 506, and DRX state information blocks 508 and 510. The MAC 502 performs one or more of delivery of a first data snapshot 512 to the first scheduler 504 and delivery of a second data snapshot 514 to the second scheduler 506. The schedulers track DRX status based on the information received in the data snapshot, and perform scheduling of the UE based at least in part on the DRX status.

The diagram 520 illustrates a MAC 522, first and second schedulers 524 and 526, and DRX state information blocks 528 and 530. The MAC 522 performs one or more of delivery of a first data snapshot 532 to the first scheduler 534 and delivery of a second data snapshot 534 to the second scheduler 526. In addition, scheduling information for the carrier controlled by the first scheduler 524 is provided to the second scheduler 526 and scheduling information for the carrier controlled by the second scheduler 526 is provided to the first scheduler 524. Such scheduling information may, for example, be part of the data snapshots 532 and 534, or may be delivered in a separate message. The schedulers track DRX status based on the information received in the data snapshot and the reciprocal scheduling information, and perform scheduling of the UE based at least in part on the DRX status.

The diagram 550 illustrates a MAC 552, first and second schedulers 554 and 556, and a DRX state information block 558. The MAC 552 tracks DRX information and delivers first and second data snapshots 560 and 562 to the schedulers 554 and 556, respectively, and also delivers DRX information to the schedulers 554 and 556, respectively. The DRX information may be delivered as part of the snapshots 560 and 562, or may be delivered in separate messages.

Figure 6:
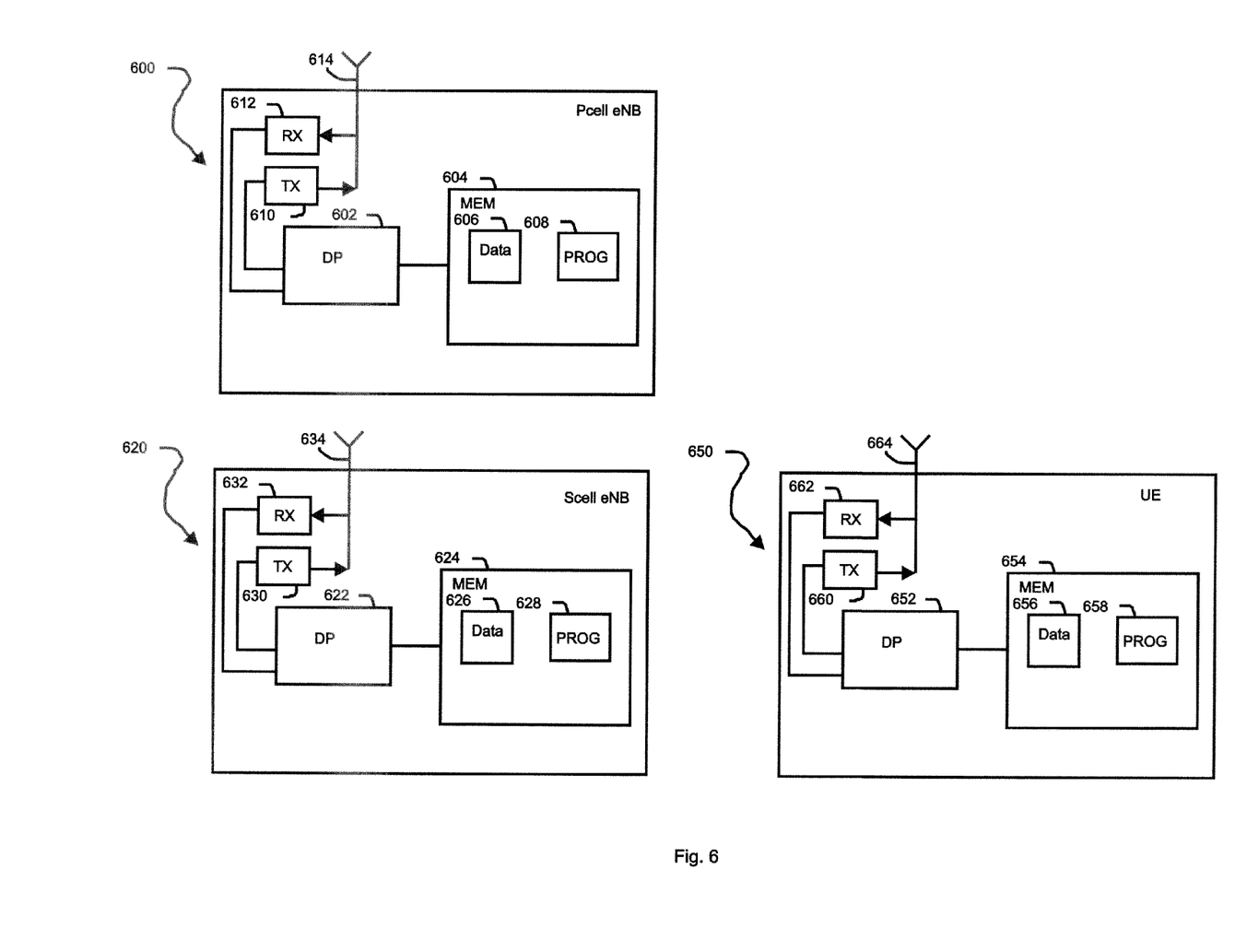
FIG. 6 illustrates elements that may be used in practicing embodiments of the present invention.

Reference is now made to FIG. 6 for illustrating a simplified block diagram of a base station, such as a Pcell eNB 600, an Scell eNB 620, and a user device, such as a UE 650, suitable for use in practicing the exemplary embodiments of this invention. In FIG. 6 apparatuses, such as the Pcell eNB 600 and the Scell eNB 620, are adapted for communication with other apparatuses having wireless communication capability, such as the UE 650. In addition, it will be recognized that the designations of the Pcell eNB 600 and the Scell eNB 620 as "Pcell" and "Scell" are made with respect to a specific UE, such as the UE 650 and are not made based on any particular hardware or software configurations of the devices themselves. With respect to other UEs, the eNB 600 may easily be designated as an Scell 600 and the eNB 620 may just as easily be designated as a Pcell 600.

The eNB 600 includes processing means such as at least one data processor (DP) 602, storing means such as at least one computer-readable memory (MEM) 604 storing data 606 and at least one computer program (PROG) 608 or other set of executable instructions, communicating means such as a transmitter TX 610 and a receiver RX 612 for bidirectional wireless communications with the UE 650 via a an antenna 614.

The eNB 620 includes processing means such as at least one data processor (DP) 622, storing means such as at least one computer-readable memory (MEM) 624 storing data 626 and at least one computer program (FROG) 628 or other set of executable instructions, communicating means such as a transmitter TX 630 and a receiver RX 632 for bidirectional wireless communications with the UE 650 via an antenna 634.

The UE 650 includes processing means such as at least one data processor (DP) 652, storing means such as at least one computer-readable memory (MEM) 654 storing data 656 and at least one computer program (PROG) 658 or other set of executable instructions, communicating means such as a transmitter TX 660 and a receiver RX 662 for bidirectional wireless communications with the eNB 600 or the eNB 620 via one or more antennas 664.

At least one of the PROGs 608 in the eNB 600 is assumed to include a set of program instructions that, when executed by the associated DP 602, enable the device to operate in accordance with the exemplary embodiments of this invention, as detailed above. In these regards the exemplary embodiments of this invention may be implemented at least in part by computer software stored on the MEM 604, which is executable by the DP 602 of the eNB 600, or by hardware, or by a combination of tangibly stored software and hardware (and tangibly stored firmware).

Similarly, at least one of the PROGs 628 in the eNB 620 is assumed to include a set of program instructions that, when executed by the associated DP 622, enable the device to operate in accordance with the exemplary embodiments of this invention, as detailed above. In these regards the exemplary embodiments of this invention may be implemented at least in part by computer software stored on the MEM 624, which is executable by the DP 622 of the eNB 620, or by hardware, or by a combination of tangibly stored software and hardware (and tangibly stored firmware).

Similarly, at least one of the PROGs 658 in the UE 650 is assumed to include a set of program instructions that, when executed by the associated DP 652, enable the device to operate in accordance with the exemplary embodiments of this invention, as detailed above. In these regards the exemplary embodiments of this invention may be implemented at least in part by computer software stored on the MEM 654, which is executable by the DP 652 of the UE 650, or by hardware, or by a combination of tangibly stored software and hardware (and tangibly stored firmware). Electronic devices implementing these aspects of the invention need not be the entire devices as depicted at FIG. 6 or may be one or more components of same such as the above described tangibly stored software, hardware, firmware and DP, or a system on a chip SOC or an application specific integrated circuit ASIC.

In general, the various embodiments of the UE 650 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 604, 624, and 654 include any data storage technology type which is suitable to the local technical environment, including but not limited to semiconductor based memory devices, magnetic memory devices and systems, optical memory devices and systems, fixed memory, removable memory, disc memory, flash memory, DRAM. SRAM, EEPROM and the like. Various embodiments of the DP 602, 622, and 652 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein the memory storing the computer program code is configured to, with the at least one processor, cause the apparatus to at least:
   receive information identifying discontinuous reception states of a user device operating in a wireless communication network, wherein the user device engages in communication in the network on at least two carriers served by at least two schedulers and wherein discontinuous reception states of the user device depend at least in part on scheduling decisions made with respect to the at least two carriers served by the at least two schedulers; and
   determine discontinuous reception states of the user device for use by at least one scheduler managing downlink communication for the user device, wherein the determination is based at least in part on the information identifying the discontinuous reception states of the user device.

2. The apparatus of claim 1, wherein the information identifying the discontinuous reception states of the user device comprises its past scheduling information, and wherein determination of discontinuous reception states of the user device is performed by at least one scheduler based on the past scheduling information relating to the carrier served by this scheduler.

3. The apparatus of claim 1, wherein the information identifying the discontinuous reception states of the user device comprises its past scheduling information, and wherein determination of discontinuous reception states of the user device is performed by at least a first scheduler based on past scheduling information relating to the carrier served by the first scheduler and past scheduling data from at least a second scheduler.

4. The apparatus of claim 3, wherein the past scheduling data from the at least a second scheduler is received together with the data snapshot data.

5. The apparatus of claim 3, wherein the past scheduling data from the at least a second scheduler is received in a message separate from the data snapshot data.

6. The apparatus of claim 1, wherein the information identifying the discontinuous reception states of the user device comprises discontinuous reception information maintained by a media access control layer of a base station and wherein the discontinuous reception information is received from the media access control layer by at least one scheduler.

7. The apparatus of claim 6, wherein the discontinuous reception information is received from the media access control layer by the at least one scheduler together with data snapshot data.

8. The apparatus of claim 6, wherein the discontinuous reception information is received from the media access control layer by the at least one scheduler in a separate message from communication of data snapshot data.

9. The apparatus of claim 1, wherein the information identifying the discontinuous reception states of the user device comprises discontinuous reception information maintained by a media access control layer of a base station and wherein the discontinuous reception information is sent from the media access control layer to at least one scheduler only if the discontinuous reception information reflects a change in the discontinuous reception active states of the user device.

10. A method comprising:
receiving information identifying discontinuous reception states of a user device operating in a wireless communication network, wherein the user device engages in communication in the network on at least two carriers served by at least two schedulers and wherein discontinuous reception states of the user device depend at least in part on scheduling decisions made with respect to the at least two carriers served by the at least two schedulers; and
determining discontinuous reception states of the user device for use by at least one scheduler managing downlink communication for the user device, wherein the determination is based at least in part on the information identifying the discontinuous reception states of the user device.

11. The method of claim 10, wherein the information identifying the discontinuous reception states of the user device comprises past scheduling information, and wherein determination of discontinuous reception states of the user device is performed by at least one scheduler based on past scheduling information relating to the carrier served by this scheduler.

12. The method of claim 11, wherein the information identifying the discontinuous reception states of the user device comprises past scheduling information, and wherein determination of discontinuous reception states of the user device is performed by at least a first scheduler based on past scheduling information relating to the carrier served by the first scheduler and past scheduling data from at least a second scheduler.

13. The method of claim 12, wherein the past scheduling data from the at least a second scheduler is received together with the data snapshot data.

14. The method of claim 12, wherein the past scheduling data from the at least a second scheduler is received in a message separate from the data snapshot data.

15. The method of claim 10, wherein the information identifying the discontinuous reception states of the user device comprises discontinuous reception information maintained by a media access control layer of a base station and wherein the discontinuous reception information is received by at least one scheduler from the media access control layer.

16. The method of claim 15, wherein the discontinuous reception information is received from the media access control layer by the at least one scheduler together with data snapshot data.

17. The method of claim 15, wherein the discontinuous reception information is received from the media access control layer by the at least one scheduler in a separate message from communication of data snapshot data.

18. The method of claim 10, wherein the information identifying the discontinuous reception states of the user device comprises discontinuous reception information maintained by a media access control layer of a base station and wherein the discontinuous reception information is sent from the media access control layer to at least one scheduler only if the discontinuous reception information reflects a change in the discontinuous reception active states of the user device.

19. A non-transitory computer readable medium storing a program of instructions, execution of which by a processor configures an apparatus to at least:
receive information identifying discontinuous reception states of a user device operating in a wireless communication network, wherein the user device engages in communication in the network on at least two carriers served by at least two schedulers and wherein discontinuous reception states of the user device depend at least in part on scheduling decisions made with respect to the at least two carriers served by the at least two schedulers; and
determine discontinuous reception states of the user device for use by at least one scheduler managing downlink communication for the user device, wherein the determination is based at least in part on the information identifying the discontinuous reception states of the user device.

20. The computer readable medium of claim 19, wherein the information identifying the discontinuous reception states of the user device comprises past scheduling information, and wherein determination of discontinuous reception states of the user device is performed by at least one scheduler based on past scheduling information relating to the carrier served by this scheduler.

21. The computer readable medium of claim 19, wherein the information identifying the discontinuous reception states of the user device comprises past scheduling information, and wherein determination of discontinuous reception states of the user device is performed by at least a first scheduler based on past scheduling information relating to the carrier served by the first scheduler and past scheduling data from at least a second scheduler.

22. The computer readable medium of claim 20, wherein the past scheduling data from the at least a second scheduler is received together with the data snapshot data.

23. The computer readable medium of claim 20, wherein the past scheduling data from the at least a second scheduler is received in a message separate from the data snapshot data.

24. The computer readable medium of claim 19, wherein the information identifying the discontinuous reception states of the user device comprises discontinuous reception information maintained by a media access control layer of a base station and wherein the discontinuous reception information is received by at least one scheduler from the media access control layer.

25. The computer readable medium of claim 24, wherein the discontinuous reception information is received from the media access control layer by the at least one scheduler together with data snapshot data.

26. The computer readable medium of claim 24, wherein the discontinuous reception information is received from the media access control layer by the at least one scheduler in a separate message from communication of data snapshot data.

27. The computer readable medium of claim 19, wherein the information identifying the discontinuous reception states of the user device comprises discontinuous reception information maintained by a media access control layer of a base station and wherein the discontinuous reception information is sent from the media access control layer to at least one scheduler only if the discontinuous reception information reflects a change in the discontinuous reception active states of the user device.

\* \* \* \* \*